United States Patent
Lim et al.

(10) Patent No.: US 9,746,738 B1
(45) Date of Patent: Aug. 29, 2017

(54) LIQUID CRYSTAL DISPLAY DEVICE AND METHOD OF MANUFACTURING THE SAME

(71) Applicant: Samsung Display Co., Ltd., Yongin-si (KR)

(72) Inventors: Ho Lim, Suwon-si (KR); Sung Yi Kim, Hwaseong-si (KR); Hyun Ku Ahn, Hwaseong-si (KR); Gi Hoon Yang, Ansan-si (KR); Suk Kung Chei, Suwon-si (KR); Ji Phyo Hong, Pyeongtaek-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/206,515

(22) Filed: Jul. 11, 2016

(30) Foreign Application Priority Data

Feb. 12, 2016 (KR) .................. 10-2016-0016367

(51) Int. Cl.
*G02F 1/1343* (2006.01)
*G02F 1/137* (2006.01)
(Continued)

(52) U.S. Cl.
CPC ............ *G02F 1/137* (2013.01); *G02F 1/1368* (2013.01); *G02F 1/13439* (2013.01); *G02F 1/133345* (2013.01); *G02F 1/133365* (2013.01); *G02F 1/133512* (2013.01); *G02F 1/133514* (2013.01); *G02F 1/133707* (2013.01); *G02F 1/133723* (2013.01); *G02F 1/134336* (2013.01); *G02F 1/136286* (2013.01); *G02F 2001/13706* (2013.01); *G02F 2001/13712* (2013.01); *G02F 2001/13775* (2013.01); *G02F 2001/133357* (2013.01); *G02F 2001/133519* (2013.01);
(Continued)

(58) Field of Classification Search
CPC ............. G02F 2001/134372; G02F 1/133707
See application file for complete search history.

(56) References Cited

U.S. PATENT DOCUMENTS 8,793,858 B2   8/2014  Kim
9,052,548 B2   6/2015  Choi et al.
(Continued)

FOREIGN PATENT DOCUMENTS

KR    10-2011-0066036    6/2011
KR    10-2013-0032423    4/2013
(Continued)

*Primary Examiner* — Phu Vu
(74) *Attorney, Agent, or Firm* — H.C. Park & Associates, PLC

(57) ABSTRACT

A liquid crystal display device including: a first substrate including a first base substrate, a first field-generating electrode disposed on the first base substrate, and a second field-generating electrode disposed on the first field-generating electrode; a second substrate facing the first base substrate and disposed spaced apart from the first substrate; a liquid crystal layer including liquid crystals, in which an electric field is formed by the first field-generating electrode and the second field-generating electrode, being disposed between the first substrate and the second substrate and contacting the second field-generating electrode; and a plurality of first projections disposed between the second field-generating electrode and the liquid crystal layer.

20 Claims, 17 Drawing Sheets

(51) Int. Cl.
*G02F 1/1335* (2006.01)
*G02F 1/1333* (2006.01)
*G02F 1/1368* (2006.01)
*G02F 1/1362* (2006.01)
*G02F 1/1337* (2006.01)

(52) U.S. Cl.
CPC ............ *G02F 2001/133738* (2013.01); *G02F 2001/134372* (2013.01); *G02F 2201/121* (2013.01); *G02F 2201/123* (2013.01); *G02F 2203/05* (2013.01)

(56) References Cited

U.S. PATENT DOCUMENTS

| | | |
|---|---|---|
| 9,117,707 B2 * | 8/2015 | Choi ................. G02F 1/133345 |
| 9,291,864 B2 | 3/2016 | Rho et al. |
| 2002/0149728 A1 * | 10/2002 | Ogishima ......... G02F 1/133555 |
| | | 349/129 |
| 2015/0085241 A1 | 3/2015 | Yuichi et al. |
| 2017/0068133 A1 | 3/2017 | Lim et al. |

FOREIGN PATENT DOCUMENTS

| | | |
|---|---|---|
| KR | 10-2013-0059287 | 6/2013 |
| KR | 10-2015-0035393 | 4/2015 |
| KR | 10-2017-0029038 | 3/2017 |

* cited by examiner

LIQUID CRYSTAL DISPLAY DEVICE AND METHOD OF MANUFACTURING THE SAME

CROSS-REFERENCE TO RELATED APPLICATION

This application claims priority from and the benefit of Korean Patent Application No. 10-2016-0016367, filed on Feb. 12, 2016, which is hereby incorporated by reference for all purposes as if fully set forth herein.

BACKGROUND

Field

Exemplary embodiments relate to a liquid crystal display device and a method of manufacturing the liquid crystal display device.

Discussion of the Background

A liquid crystal display (LCD) device, which is one of the most widely-used display devices, includes two substrates on which field-generating electrodes such as pixel electrodes and a common electrode are formed and a liquid crystal layer which is disposed between the two substrates.

The LCD device generates an electric field by applying a voltage to the field-generating electrodes and determines an alignment direction of liquid crystals in the liquid crystal layer. The LCD device displays an image by controlling the polarization of light incident thereupon.

The liquid crystals in the liquid crystal layer need to be aligned in a particular direction at the interfaces between the liquid crystals and the field-generating electrodes to realize an image. The uniformity of the alignment of the liquid crystals is one of the most important factors that determine the display quality of the LCD device. Accordingly, one or more alignment layers having anisotropy are disposed between the liquid crystal layer and the field-generating electrodes so as to make an initial arrangement state and the alignment direction of the liquid crystals uniform.

An alignment layer having anisotropy may be formed by applying light to a polyimide (PI)-based alignment layer including a polymer having a photo-reactive group and an imide group in the repeating unit of a main chain thereof so as to impart anisotropy to the PI-based alignment layer. The alignment layer may become anisotropic through photo-isomerization or photo-decomposition caused by the irradiation of polarized light.

It is noted, however, there is a limit in improving the display quality of an LCD device using a PI-based alignment layer including a polymer having a photo-reactive group. For example, a PI-based alignment layer including a photo-reactive group has low thermal stability and low hardness, and thus, may cause various problems such as alignment instability and image sticking due to a weak alignment force.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display device for stabilizing an initial alignment state of liquid crystals.

Exemplary embodiments also provide a method of manufacturing the liquid crystal display device.

Additional aspects will be set forth in the detailed description which follows, and, in part, will be apparent from the disclosure, or may be learned by practice of the inventive concept.

An exemplary embodiment discloses a liquid crystal display device including: a first substrate including a first base substrate, a first field-generating electrode disposed on the first base substrate, and a second field-generating electrode disposed on the first field-generating electrode; a second substrate facing the first base substrate and spaced apart from the first substrate; a liquid crystal layer including liquid crystals, in which an electric field is formed by the first field-generating electrode and the second field-generating electrode, being disposed between the first substrate and the second substrate and contacting the second field-generating electrode; and a plurality of first projections disposed between the second field-generating electrode and the liquid crystal layer.

An exemplary embodiment also discloses a method of manufacturing an liquid crystal display device including: preparing a first substrate including a first base substrate, a first field-generating electrode disposed on the first base substrate, an insulating layer disposed on the first field-generating electrode, and a second field-generating electrode disposed on the insulating layer; preparing a second substrate facing the first base substrate and disposed spaced apart from the first substrate; providing a liquid crystal layer including a photo-reactive single molecule and liquid crystals, and disposed between the first substrate and the second substrate and contacting the second field-generating electrode; applying light in a state in which an electric field is applied to the liquid crystal layer and forming photo-polymer projections between the second field-generating electrode and the liquid crystal layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
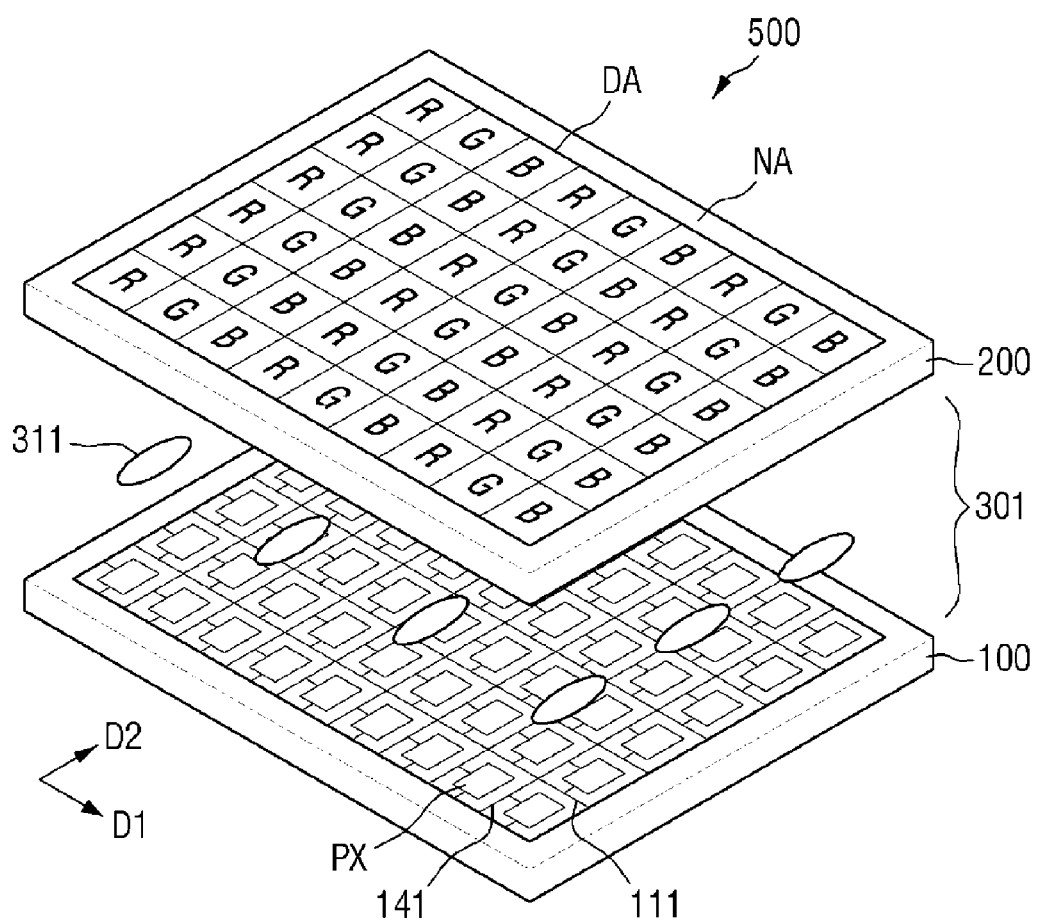
FIG. 1 is a schematic exploded perspective view of a liquid crystal display (LCD) device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a schematic exploded perspective view of a liquid crystal display (LCD) device according to an exemplary embodiment.

Referring to FIG. 1, an LCD device includes a display panel 500. The display panel 500 includes a first substrate 100, a second substrate 200 spaced apart from and facing the first substrate 100, and a liquid crystal layer 301 including a plurality of liquid crystals 311 and disposed between the first substrate 100 and the second substrate 200.

The display panel 500 includes a display area DA and a non-display area NA. The display area DA is an area in which an image is viewed, and the non-display area NA is an area in which no image is viewed. The display area DA is surrounded by the non-display area NA.

The display area DA includes pixel regions PX. The pixel regions PX may be arranged along a first direction D1 (for example, a row direction) and a second direction D2 (for example, a column direction) and may be arranged substantially in a matrix form. Each of the pixel regions PX may uniquely display one of primary colors. For example, the primary colors may include red, green, and blue.

The non-display area NA may be a light-shielding area. For example, the non-display area NA may be overlapped by a front chassis (not illustrated) of the LCD device and may block the transmission of light. A gate driver (not illustrated), which provides gate signals to switching devices (not illustrated) in the pixel regions PX of the display area DA, and a data driver (not illustrated), which provides data signals to the switching devices in the pixel regions PX of the display area DA, may be provided on one of the first substrate 100 and the second substrate 200 in the non-display area NA.

The first substrate 100 may be a lower display substrate, and the second substrate 200 may be an upper display substrate. Particularly, the first substrate 100 may be a substrate on which thin-film transistors (TFTs) are disposed, and the second substrate 200 may be a substrate spaced apart from and facing the first substrate 100. For example, the first substrate 100 may include gate lines 111, which extend in the first direction D1, and data lines 141, which extend in the second direction D2 that intersects the first direction D1. Each of the gate lines 111 may electrically connect the gate driver to the switching devices in the pixel regions PX arranged along the first direction D1, and each of the data lines 141 may electrically connect the data driver to the switching devices in the pixel regions PX arranged along the second direction D2.

The LCD device may further include a backlight unit (not illustrated). The backlight unit is disposed below the first substrate 100 and applies light from below the display panel 500 including the first substrate 100 and the second substrate 200. The backlight unit may include a light source (not illustrated), a light guide plate (not illustrated), which guides incident light from the light source to be incident on the display panel 500, a reflective sheet (not illustrated), which is disposed below the light guide plate, and one or more optical sheets (not illustrated), which are disposed on the light guide plate and configured to improve the luminance properties of light traveling toward the display panel 500.

Figure 2:
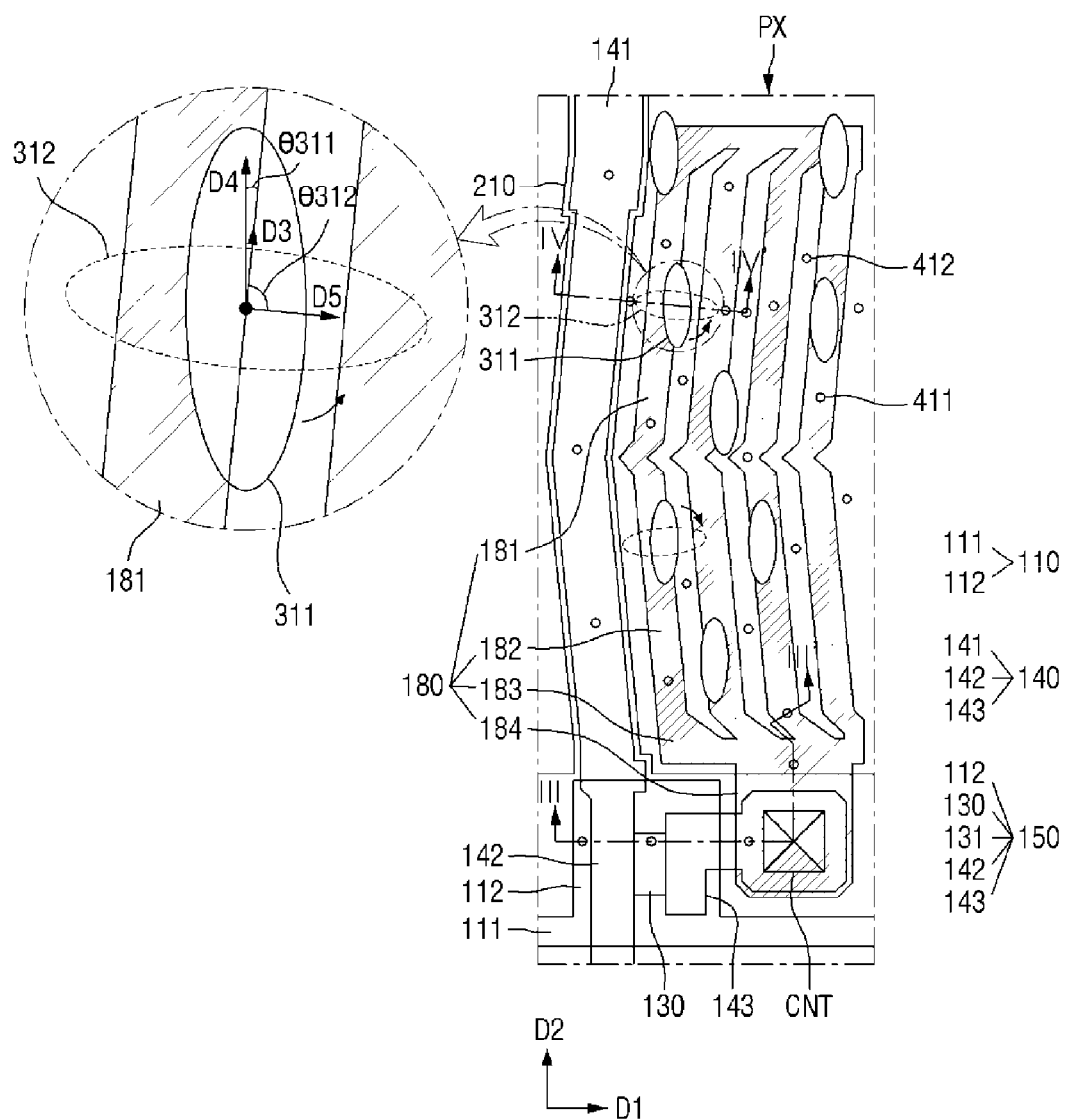
FIG. 2 is a layout view of a pixel region of the LCD device of FIG. 1 according to an exemplary embodiment.
Figure 3:
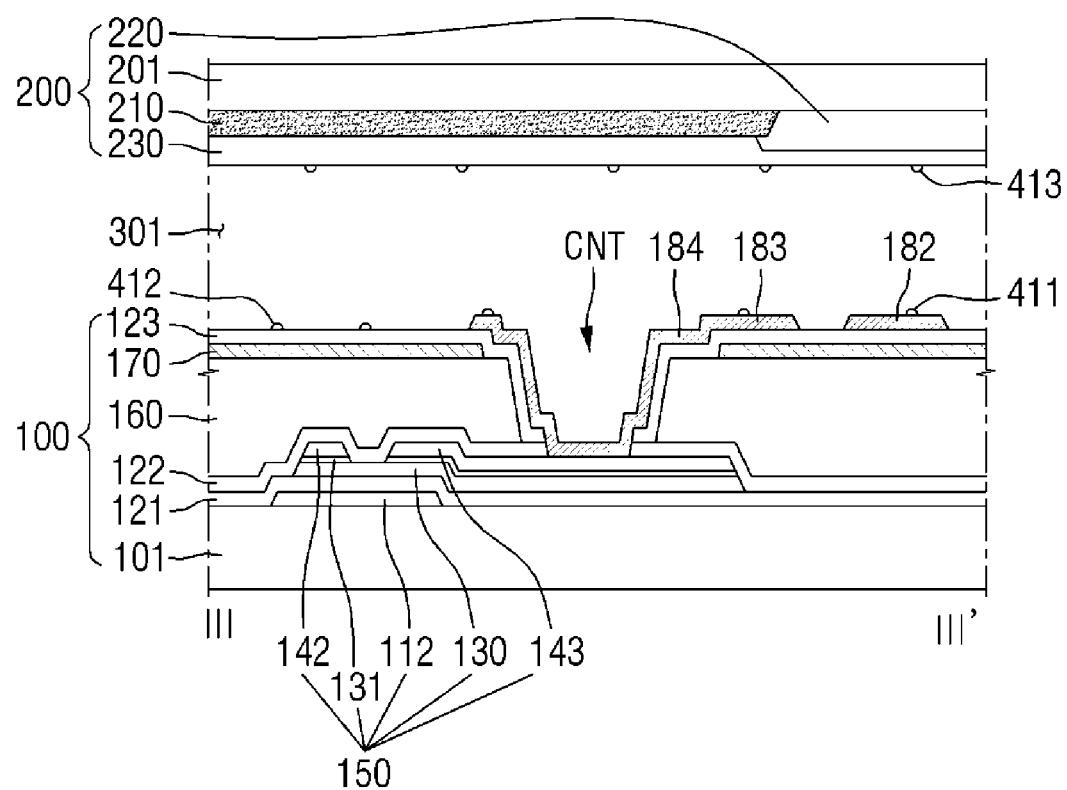
FIG. 3 is a cross-sectional view taken along sectional line of FIG. 2 according to an exemplary embodiment.
Figure 4:
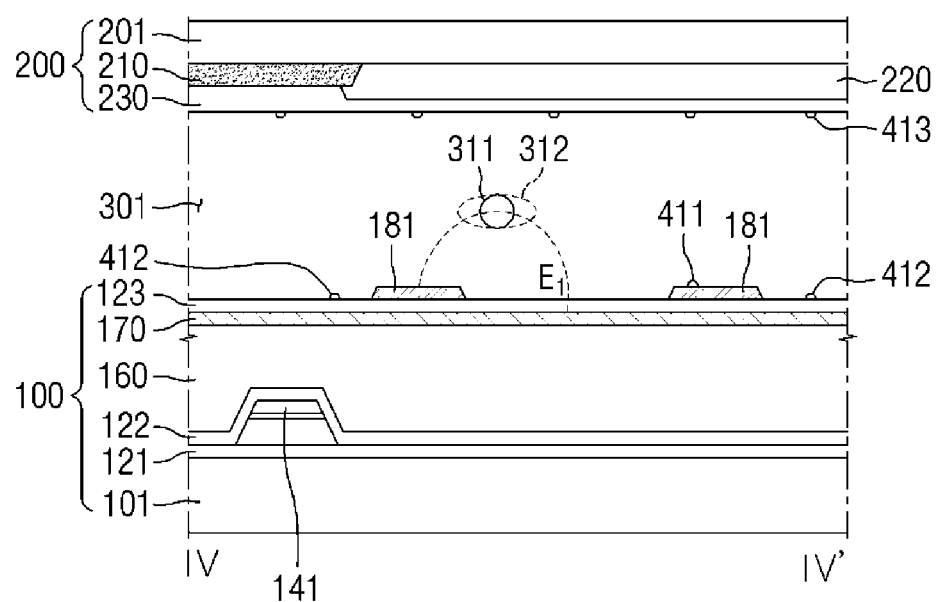
FIG. 4 is a cross-sectional view taken along sectional line IV-IV' of FIG. 2 according to an exemplary embodiment.

FIG. 2 is a layout view of a pixel region of the LCD device of FIG. 1 according to an exemplary embodiment. FIG. 3 is a cross-sectional view taken along sectional line of FIG. 2 according to an exemplary embodiment. FIG. 4 is a cross-sectional view taken along sectional line IV-IV' of FIG. 2 according to an exemplary embodiment.

Referring to FIG. 2, FIG. 3, and FIG. 4, the first substrate 100 includes a first base substrate 101, at least one switching device 150, a common electrode 170, a pixel electrode 180, and a plurality of passivation/insulating layers.

The first base substrate 101 may include a transparent insulating substrate. For example, the first base substrate 101 may be a silicon substrate, a glass substrate, or a plastic substrate.

A gate wiring layer 110 is disposed on the first base substrate 101. The gate wiring layer 110 includes a gate line 111 and a gate electrode 112.

The gate line 111 extends substantially in a first direction D1. The gate electrode 112 may protrude from the gate line 111 to one side of a second direction D2. The gate electrode 112 may be formed in one body with the gate line 111 without a physical boundary therebetween. The gate wiring layer 110 may be formed of an element selected from among tantalum (Ta), tungsten (W), titanium (Ti), molybdenum (Mo), aluminum (Al), copper (Cu), silver (Ag), chromium (Cr), and neodymium (Nd), or an alloy material or a compound material having the element as a main ingredient.

A first insulating layer 121 is disposed on the gate wiring layer 110 and on the entire surface of the first base substrate 101. The first insulating layer 121 may be formed of an insulating material and may electrically insulate the overlying layer from the underlying layer. For example, the first insulating layer 121 may be formed of silicon nitride ($SiN_x$), silicon oxide ($SiO_x$), silicon nitride oxide ($SiN_xO_y$), or silicon oxynitride ($SiO_xN_y$). The first insulating layer 121 may include a multilayer structure including at least two insulating layers having different physical properties.

A semiconductor layer 130 is disposed on the first insulating layer 121. At least part of the semiconductor layer 130 may be disposed in an area that overlaps with the gate electrode 112. The semiconductor layer 130 may perform a function of a channel of the switching device 150, and may turn on or turn off the channel of the switching device 150 according to a voltage provided to the gate electrode 112. The semiconductor layer 130 may be formed of a semiconductor material, such as amorphous silicon, polycrystalline silicon, or an oxide semiconductor. FIG. 2, FIG. 3, and FIG. 4 illustrate an example in which the semiconductor layer 130 is overlapped by a data wiring layer 140, but the semiconductor layer 130 may be disposed only in the area that overlaps with the gate electrode 112.

The data wiring layer 140 is disposed on the semiconductor layer 130. The data wiring layer 140 includes a data line 141, a source electrode 142, and a drain electrode 143.

The data line 141 may extend substantially in the second direction D2 and may intersect the gate line 111. A data signal may be applied to the data line 141.

The source electrode 142 and the drain electrode 143 may be spaced apart from, and face, each other, and may be disposed over the gate electrode 112 and the semiconductor layer 130. The source electrode 142 and the data line 141 may be formed in one body with each other without a physical boundary therebetween. FIG. 2 illustrates an example in which the source electrode 142 is formed as part of the data line 141, but the source electrode 142 may be formed protruding from the data line 141 toward the gate electrode 112. The drain electrode 142 electrically connected to the pixel electrode 180 through a contact hole CNT that will be described later. The data wiring layer 140 may be formed of a refractory metal such as silver (Ag), gold (Au), copper (Cu), nickel (Ni), platinum (Pt), palladium (Pd), tungsten (W), aluminum (Al), tantalum (Ta), molybdenum (Mo), zinc (Zn), iron (Fe), titanium (Ti), or zirconium (Zr), or an alloy or a nitride of the refractory metal.

An ohmic contact layer 131 may be disposed between the semiconductor layer 130 and the data wiring layer 140. The ohmic contact layer 131 may include an n+ hydrogenated amorphous silicon material doped with a high concentration of n-type impurities, or a silicide material.

The gate electrode 112, the semiconductor layer 130, the source electrode 142, and the drain electrode 143 may form the switching device 150. For example, the switching device 150 may be a TFT. Particularly, the gate electrode 112, which is a control terminal of the switching device 150, is connected to the gate line 111; the source electrode 142, which is an input terminal of the switching device 150, is connected to the data line 141; and the drain electrode 143, which is an output terminal of the switching device 150, is electrically connected to the pixel electrode 180. The switching device 150 may be disposed in each of the pixel regions PX, and may operate independently according to a gate signal provided from the gate line 111 and a data signal provided from the data line 141.

A passivation layer 122 is disposed on the data wiring layer 140 and on the entire surface of the first base substrate 101. The passivation layer 122 may be formed of an inorganic layer and may have a single layer or multi-layer structure. The passivation layer 122 may prevent the underlying wirings and electrodes from being exposed to be in direct contact with an organic material. A planarization layer 160 may be disposed on the passivation layer 122 and on the entire surface of the first substrate 101. The passivation layer 160 may be formed of an organic layer. The planarization layer 160 may make the heights of the elements stacked on the first base substrate 101 uniform.

The common electrode 170 is disposed on the planarization layer 160. The common electrode 170 may be disposed on the entire surface of each of the pixel regions PX excluding the contact hole CNT. The common electrode 170 may include a transparent electrode. For example, the transparent electrode may be formed of indium tin oxide (ITO) or indium zinc oxide (IZO), but the present invention is not limited thereto. The common electrode 170 is a field-generating electrode to which a common voltage is applied and may control an alignment direction of the liquid crystals 311 in the liquid crystal layer 301 by forming an electric field together with the pixel electrode 180 to which a data voltage is applied. A second insulating layer 123 is disposed on the common electrode 170, and may insulate the common electrode 170 from the pixel electrode 180.

The contact hole CNT is formed in the passivation layer 122, the planarization layer 160, and the second insulating layer 123 such that part of the drain electrode 143 may be exposed. The drain electrode 143 may be exposed through the contact hole CNT and may be electrically connected to the pixel electrode 180.

The pixel electrode 180 is disposed on the second insulating layer 123 in each of the pixel regions PX and on the drain electrode 143 exposed through the contact hole CNT. The pixel electrode 180 may be placed in direct contact with the liquid crystal layer 301. The pixel electrode 180 may be a transparent electrode formed of ITO or IZO. The pixel electrode 180 may be a field-generating electrode to which a data voltage is applied, and may form an electric field together with the common electrode 170. The common electrode 170 may be disposed on the pixel electrode 180 and may be placed in direct contact with the liquid crystal layer 301. A plurality of first projections 411 that will be described later may be disposed on the common electrode 170 and may be spaced apart from one another and have shapes in the form of a dot.

The pixel electrode 180 may include a plurality of first branch electrodes 181, which extend in parallel to one another in a third direction D3, a plurality of second branch electrodes 182, which extend from the first branch electrodes 181 in parallel to one another in a direction intersecting the third direction D3, connecting electrodes 183, which are provided at ends of the first branch electrodes 181 and/or at ends of the second branch electrodes 182 and connect the first branch electrodes 181 and the second branch electrodes 182 to one another, and a protruding electrode 184, which protrudes from one of the connecting electrodes 183 toward the contact hole CNT. Slits may be formed between the first branch electrodes 181 and between the second branch electrodes 182.

The pixel electrode 180 may form at least two domains in a single pixel region PX in the form of bars that are symmetrical with respect to a middle portion of the pixel electrode 180. For example, the first branch electrodes 181 may form one domain, and the second branch electrodes 182 may form another domain. Accordingly, the alignment of the long axes of the liquid crystals 311 may differ from one domain to another domain during the driving of the LCD device, and as a result, a luminance deterioration phenomenon that may occur when a viewer watches the display panel 500 from a particular direction may be alleviated. The protruding electrode 184 is electrically connected to the drain electrode 143 via the contact hole CNT, and is thus provided with a data voltage, and the connecting electrodes 183 connect the protruding electrode 184 to the second branch electrodes 182, thereby uniformly delivering the data voltage received from the drain electrode 143 to the first branch electrodes 181 and the second branch electrodes 182.

The first projections 411 are disposed on the pixel electrode 180. Particularly, the first projections 411 may be disposed directly on the surfaces of the first branch electrodes 181, the second branch electrodes 182, the connecting electrodes 183, and the protruding electrode 184 of the pixel electrode 180. For example, the first projections 411 may be adhered onto the surface of the pixel electrode 180 in contact with the liquid crystal layer 301.

The first projections 411 may be formed on the surface of the pixel electrode 180 and may be spaced apart from one another, each having a shape of a dot, and a distance between a pair of adjacent first projections 411 may be generally uniform throughout the pixel electrode 180 and may be larger than the width of the first projections 411. The presence of the first projections 411 may cause an increase in the unevenness of a surface of the pixel electrode 180.

A plurality of second projections 412 is disposed on the second insulating layer 123. Particularly, the second projections 412 may be disposed on the surface of the second insulating layer 123 exposed through the slits between the first branch electrodes 181 and between the second branch electrodes 182 of the pixel electrode 180, and may be disposed on the rest of the surface of the second insulating layer 123 in a region where the pixel electrode 180 is not provided. For example, the second projections 412 may be adhered onto the surface of the second insulating layer 123 in contact with the liquid crystal layer 301.

The second projections 412 may be formed on the surface of the second insulating layer 123 and may be spaced apart from one another, each having a shape of a dot, and a distance between a pair of adjacent second projections 412 may be generally uniform throughout the second insulating layer 123 and may be larger than the width of the second projections 412. The presence of the second projections 412 may increase the unevenness of a surface of the second insulating layer 123.

The shape and the size of the first projections 411 may be substantially the same as the shape and the size of the second projections 412. However, the distance between a pair of adjacent first projections 411 may differ from the distance between a pair of adjacent second projections 412. Unevenness of a surface of the pixel electrode 180, defined by the first projections 411, may differ from unevenness of a surface of the second insulating layer 123, defined by the second projections 412.

The first projections 411 and the second projections 412 may both be fine projections obtained from the polymerization of photo-reactive single molecules. For example, the photo-reactive single molecules may be reactive mesogens, and the first projections 411 and the second projections 412 may be the polymers of the reactive mesogens.

The photo-reactive single molecules, which are a compound including a rigid group (such as a mesogenic group) for expressing liquid crystal properties and having a polymerizable reactive group (or terminal group), may denote cross-linking small molecules or polymers and may cause a polymerization reaction upon absorption of light of a particular wavelength and/or heat.

For example, the photo-reactive single molecules may include a compound represented by Formula 1:

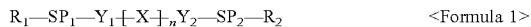  <Formula 1> where X denotes a divalent rigid group and may be any one of

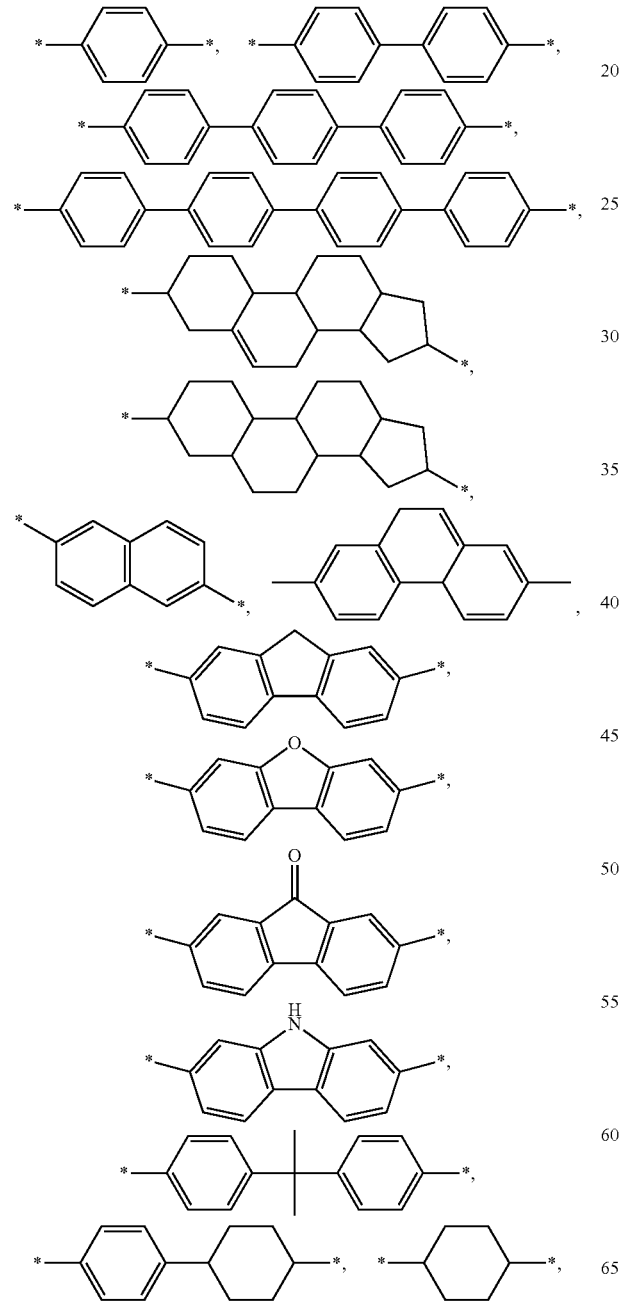

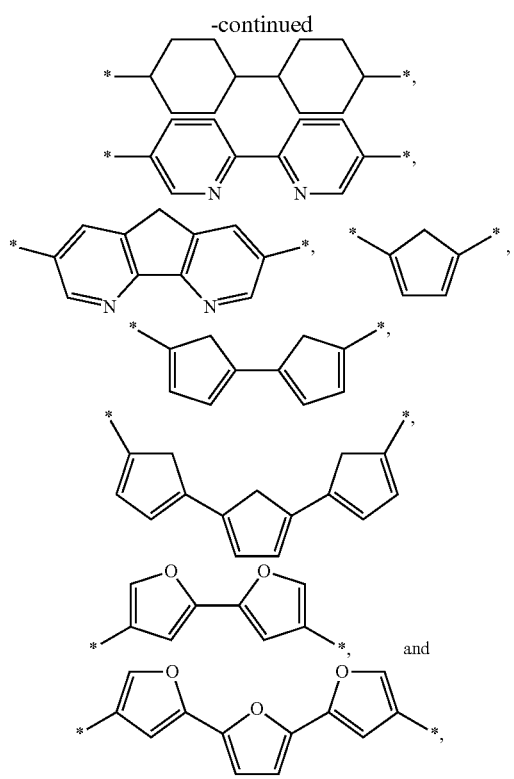

and, n is a natural number between 1 and 3. Each of $SP_1$ and $SP_2$ is a divalent spacer group and is independently one of a single-, double-, or triple-bond, an alkyl group having 1 to 12 carbon atoms, a divalent flexible group to which an alkyl group having 1 to 12 carbon atoms and at least one

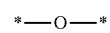

are bonded, a divalent flexible group to which an alkyl group having 1 to 12 carbon atoms and at least one

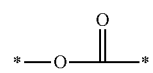

are bonded, and a divalent flexible group to which an alkyl group having 1 to 12 carbon atoms and at least one

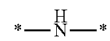

are bonded. Each of $R_1$ and $R_2$ is a reactive group and may be one of

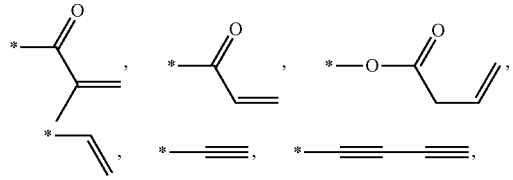

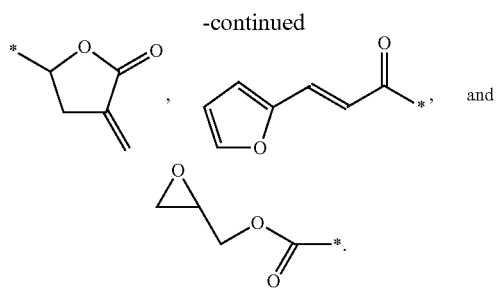

, and

In an exemplary embodiment, the photo-reactive single molecules may include a compound represented by Formula 2:

<Formula 2>
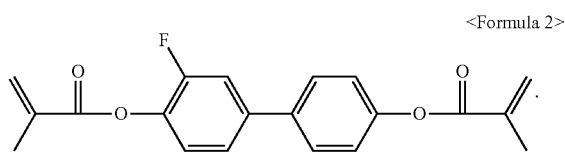 [SMILES: C=C(C)C(=O)Oc1ccc(-c2ccc(OC(=O)C(=C)C)c(F)c2)cc1]

The first projections 411 and the second projections 412 may align and stabilize the liquid crystals 311 in an initial alignment state such that the long axes of the liquid crystals 311 may be oriented toward the second direction D2 due to the interaction force therebetween. Accordingly, uniformity in the alignment direction of liquid crystals 311 adjacent to the pixel electrode 180 may be ensured, and display quality of the LCD device may be improved by completely blocking the transmission of light in the absence of an electric field.

The second substrate 200 will hereinafter be described. The second substrate 200 includes a second base substrate 201, a light-shielding member 210, a color filter 220, and an overcoat layer 230.

The second base substrate 201, like the first base substrate 101, may be a transparent insulating substrate. The light-shielding member 210 is disposed on the second base substrate 201. For example, the light-shielding member 210 may be a black matrix. The light-shielding member 210 may be disposed along the boundaries of the pixel regions PX, i.e., in an area overlapping with the data line 141, in an area overlapping with the gate line 111, and in an area overlapping with the switching device 150. The light-shielding member 210 may be disposed in a region in which the transmission of incident light from the backlight unit (not illustrated) below the first substrate 100 is substantially blocked, and may prevent unintended color mixing and light leakage.

The color filter 220 may be disposed on the light-shielding member 210 in an area that overlaps with each of the pixel regions PX. The color filter 220 may selectively transmit light of a particular wavelength therethrough. For example, the color filter 220 may selectively transmit one of red light, green light, and blue light therethrough. The color filter 220 may be disposed between a pair of adjacent data lines 141, and may be disposed on the entire surface of each of the pixel regions PX. Color filters transmitting light of different wavelengths therethrough may be disposed in pixel regions PX, respectively, that are adjacent to each other. FIG. 2 illustrates an example in which the color filter 220 is disposed on the second substrate 200, but the color filter 220 may be disposed on or below the switching device 150 of the first substrate 100. No color filters may be disposed in some pixel regions PX, and thus, white light may be transmitted through the corresponding pixel regions PX. The overcoat layer 230 is disposed on the light-shielding member 210 and the color filter 220 and on the entire surface of the second base substrate 201. The overcoat layer 230 may be an organic layer formed of an organic material. The overcoat layer 230 may make the heights of the elements stacked on the second base substrate 201 uniform. The overcoat layer 230 may suppress the contamination of the liquid crystal layer 301 with a compound such as a solvent from the color filter 220, and may thus prevent defects, such as image sticking, that may be caused during the driving of the LCD device. The overcoat layer 230 may be placed in direct contact with the liquid crystal layer 301.

A plurality of third projections 413 is disposed on the overcoat layer 230. Particularly, the third projections 413 may be disposed directly on the surface of the overcoat layer 230 in contact with the liquid crystal layer 301. For example, the third projections 413 may be adhered onto the surface of the overcoat layer 230.

The third projections 413 may be formed on the surface of the overcoat layer 230 and may be spaced apart from one another, each having a shape of a dot, and the distance between a pair of adjacent third projections 413 may be generally uniform throughout the overcoat layer 230 and may be larger than the width of the third projections 413. The presence of the third projections 413 may increase the unevenness of a surface of the overcoat layer 230.

The shape and the size of the third projections 413 may be substantially the same as the shape and the size of the first projections 411 and the second projections 412. However, the distance between a pair of adjacent third projections 413 may differ from the distance between a pair of adjacent first projections 411 and/or the distance between a pair of adjacent second projections 412. That is, unevenness of a surface of the overcoat layer 230, defined by the third projections 413, may differ from unevenness of a surface of the pixel electrode 180, defined by the first projections 411, and unevenness of a surface of the second insulating layer 123, defined by the second projections 412.

The third projections 413 may be fine projections obtained from the polymerization of photo-reactive single molecules. For example, the photo-reactive single molecules may be reactive mesogens, and the first projections 411 and the second projections 412 may be the polymers of the reactive mesogens. The reactive single molecules have been described above in the discussion of the first projections 411 and the second projections 412, and thus, a detailed description thereof will be omitted.

The third projections 413 may align and stabilize the liquid crystals 311 in the initial alignment state such that the long axes of the liquid crystals 311 may be oriented toward the second direction D2.

The liquid crystal layer 301 includes the liquid crystals 311, and is disposed between the first and second substrates 100 and 200. No PI-based alignment layer may be provided at the interface between the liquid crystal layer 301 and the first substrate 100 and/or between the liquid crystal layer 301 and the second substrate 200.

The liquid crystals 311 may be horizontally-aligned liquid crystals having positive dielectric anisotropy. The liquid crystals 311 in the initial alignment state may be aligned and stabilized such that their long axes may be oriented substantially toward a fourth direction D4. For example, the fourth direction D4 may be the same as the second direction D2, and an angle θ311 that the fourth direction D4 forms with the third direction D3 may be equal to or greater than 0° and equal to or less than 45°.

During the driving of the LCD device, a horizontal field $E_1$ is formed between the common electrode 170 and the pixel electrode 180, and the liquid crystals 311 in the liquid crystal layer 301 may rotate in a plane, and as a result, the liquid crystals 311 may be realigned and maintained in such a state that the long axes of liquid crystals 312 may be oriented substantially toward a fifth direction D5. For example, an angle θ312 that the fifth direction D5 forms with the third direction D3 may be about 90°, and/or the fifth direction D5 may be substantially in parallel to the horizontal field $E_1$ formed between the common electrode 170 and the pixel electrode 180.

Content of photo-reactive single molecules that remain, which is not polymerized in the liquid crystal layer 301, may be about 100 parts per million (ppm). The non-polymerized photo-reactive single molecules in the liquid crystal layer 301 may cause image sticking during the driving of the LCD device, but if the non-photo-polymerized photo-reactive single molecules are contained in the liquid crystal layer 301 in the above content range, image sticking may be effectively suppressed.

An LCD device according to another exemplary embodiment of the present disclosure will hereinafter be described. Detailed descriptions of elements of the LCD device according to the present exemplary embodiment are substantially the same as, or at least similar, to their respective counterparts of the LCD device according to the previous exemplary embodiment will be omitted to avoid obscuring the present disclosure.

Figure 5:
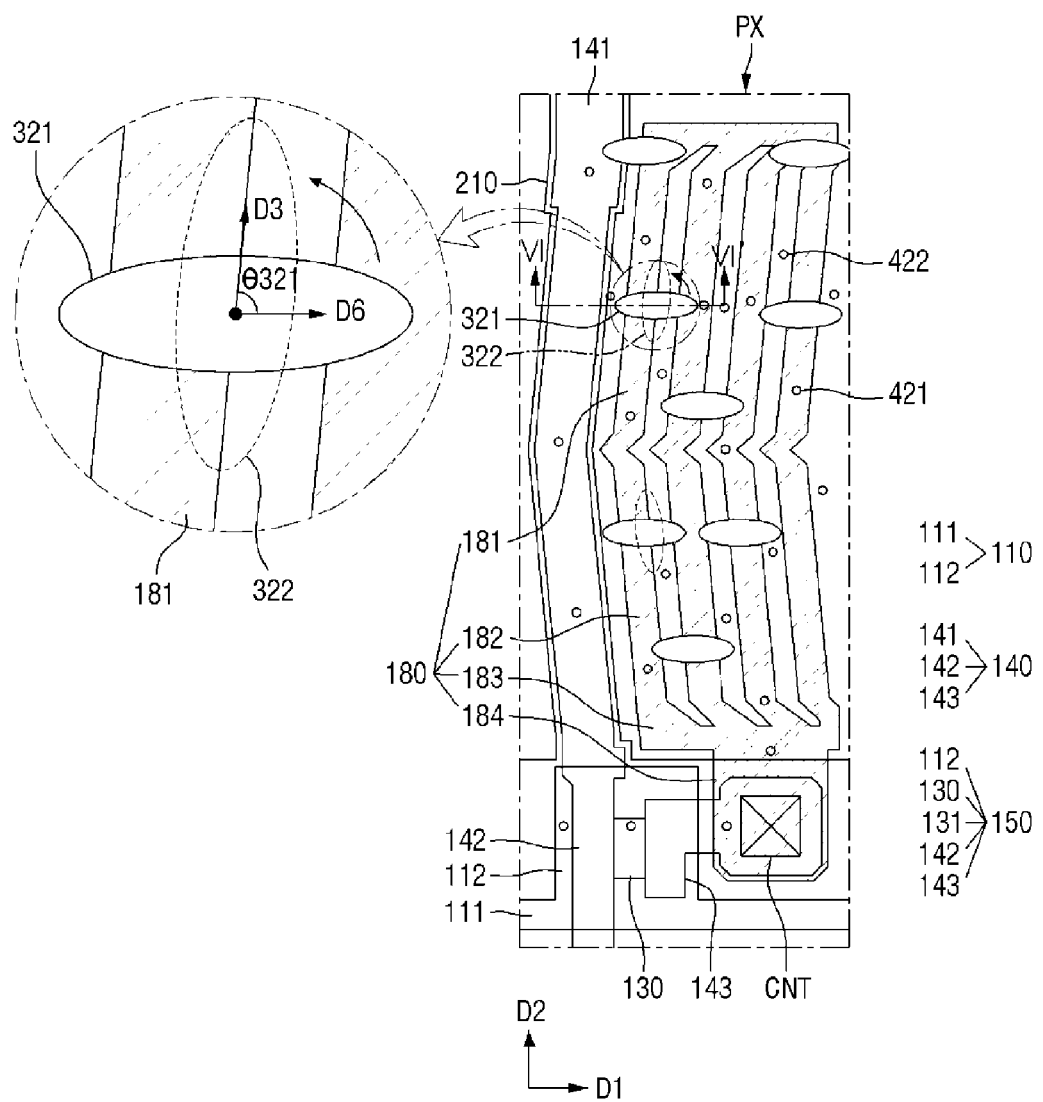
FIG. 5 is a layout view of a pixel region of an LCD device according to another exemplary embodiment.
Figure 6:
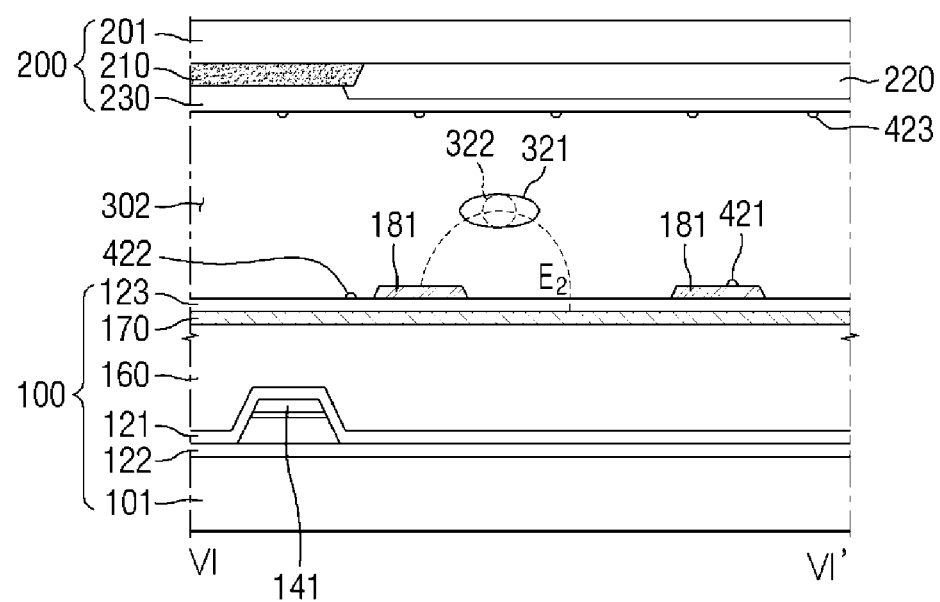
FIG. 6 is a cross-sectional view taken along sectional line VI-VI' of FIG. 5 according to another exemplary embodiment.

FIG. 5 is a layout view of a pixel region of an LCD device according to another exemplary embodiment. FIG. 6 is a cross-sectional view taken along sectional line VI-VI' of FIG. 5 according to another exemplary embodiment.

Referring to FIG. 5 and FIG. 6, the liquid crystals 321 in a liquid crystal layer 302 of the LCD device are horizontally aligned liquid crystals having negative dielectric anisotropy.

The liquid crystals 321 in an initial alignment state may be aligned and stabilized such that their long axes may be oriented substantially toward a sixth direction D6. For example, the sixth direction D6 may be substantially the same as a first direction D1, and an angle θ321 that the sixth direction D6 forms with a third direction D3 may be equal to or greater than 45° and equal to or less than 90°. During the driving of the LCD device, a horizontal field $E_2$ is formed between a common electrode 170 and a pixel electrode 180, and the liquid crystals 321 in the liquid crystal layer 302 may rotate in a plane, and as a result, the liquid crystals 321 may be realigned and maintained in such a state that the long axes of liquid crystals 322 may be oriented substantially toward the third direction D3. For example, the third direction D3 may be substantially perpendicular to the horizontal field $E_2$ formed between the common electrode 170 and the pixel electrode 180.

Figure 7:
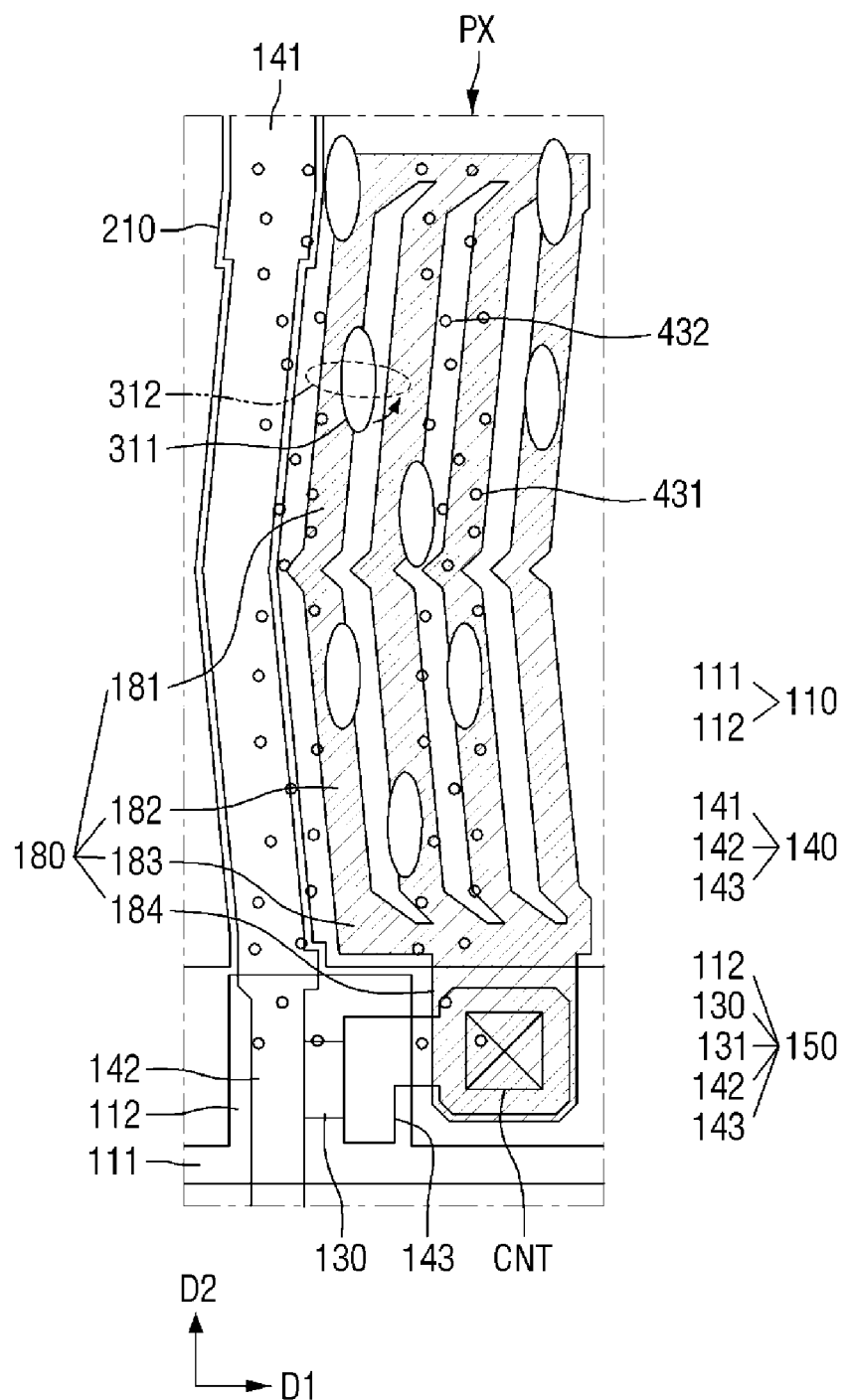
FIG. 7 is a layout view of a pixel region of an LCD device according to another exemplary embodiment.

FIG. 7 is a layout view of a pixel region of an LCD device according to another exemplary embodiment.

Referring to FIG. 7, the LCD device differs from the LCD device of FIG. 2 in that the arrangement of first projections 431 on the surface of a pixel electrode 180 and the arrangement of second projections 432 on the surface of a second insulating layer may exhibit directionality over the surface of a first substrate and that the arrangement of third projections (not illustrated) may exhibit directionality over the surface of an overcoat layer (not illustrated). As the degree of the polymerization of photo-reactive single molecules increases, the directionality of the arrangement of the first projections 431, the second projections 432, and the third projections may become more apparent. The directionality of the arrangement of the first projections 431 and the second projections 432 and the directionality of the arrangement of the third projections (not illustrated) may be substantially identical.

A maximum distribution density of a plurality of projections formed on the surface of the first substrate 100, including the first projections 431 and the second projections 432, in a first direction D1 may differ from a maximum distribution density of the plurality of projections in a second direction D2. For example, the first projections 431 and the second projections 432 may have a maximum distribution density near an imaginary extension line extending along the second direction D2, and the distribution density of the first projections 431 and the second projections 432 may gradually decrease as the distance from the imaginary extension line increases. The maximum distribution density of the plurality of projections in the second direction D2 may be greater than the maximum distribution density of the plurality of projections in the first direction D1. In addition, if the degree of the polymerization of photo-reactive single molecules increases, the photo-reactive single molecules may be polymerized substantially in the second direction D2, and thus, polymer projections having a linear shape in the direction, in which the photo-reactive single molecules are polymerized, may be formed. The difference between the distribution density of the plurality of projections in the first direction D1 and the distribution density of the plurality of projections in the second direction D2 may increase.

Figure 8:
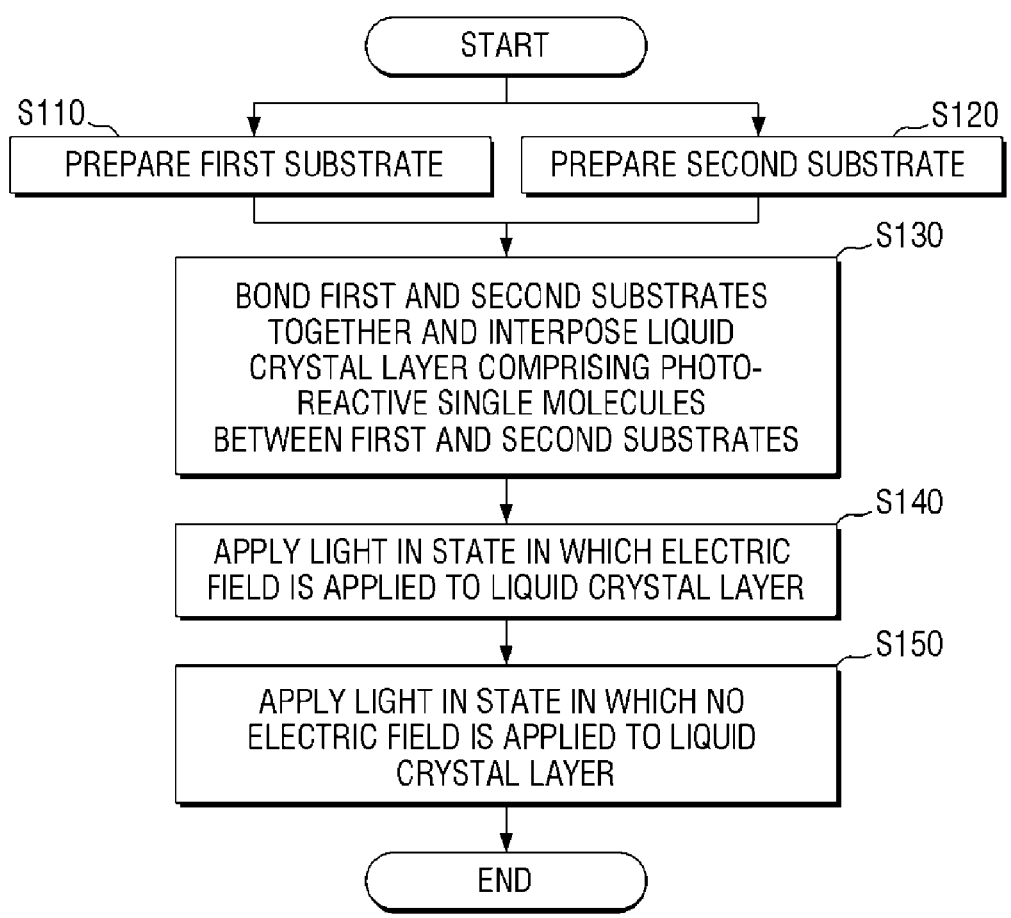
FIG. 8 is a flowchart illustrating a method of manufacturing an LCD device, according to an exemplary embodiment.
Figure 9:
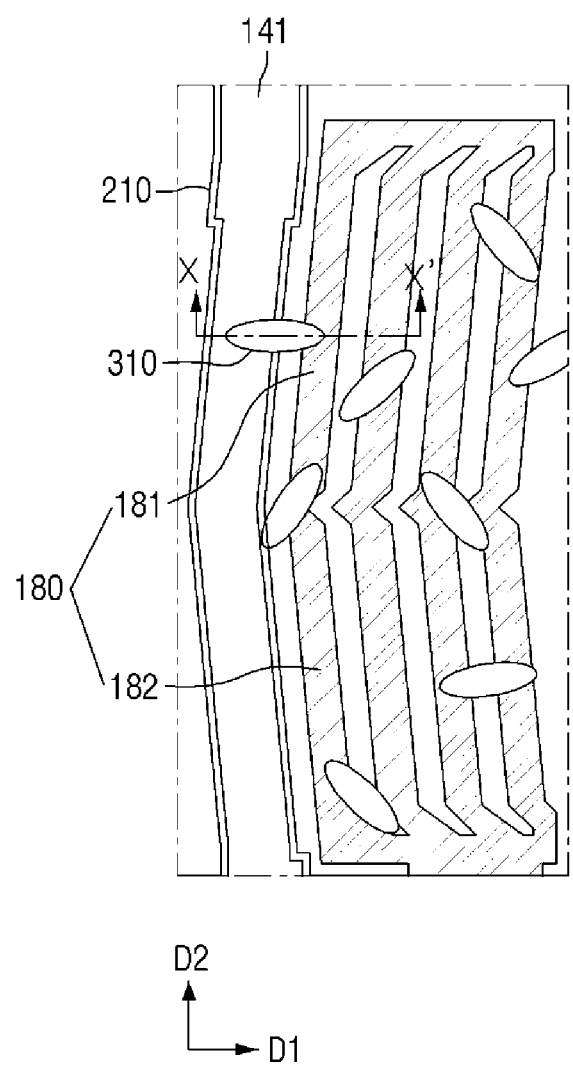
FIG. 9 is a layout view of a pixel region for explaining the method of FIG. 8 according to an exemplary embodiment.
Figure 10:
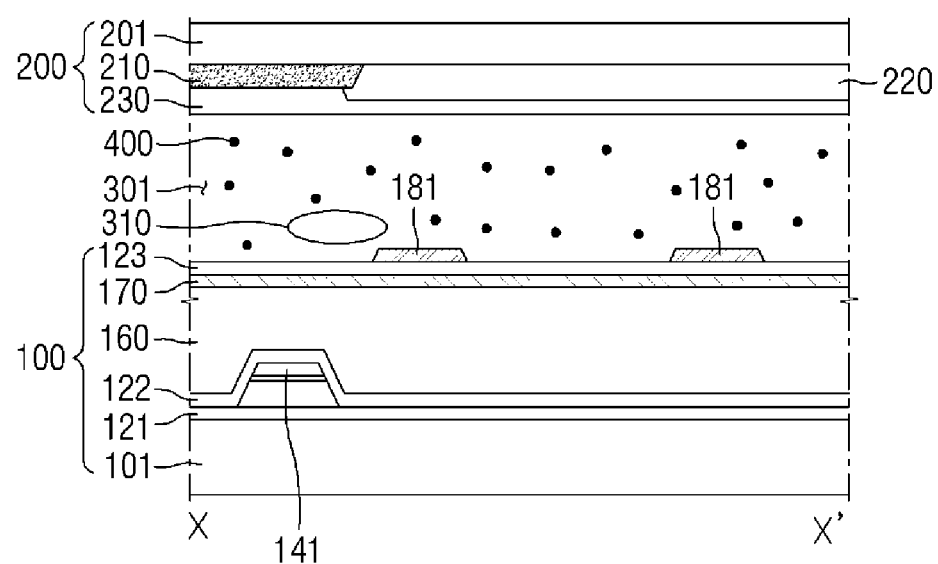
FIG. 10 is a cross-sectional view taken along sectional line X-X' of FIG. 9 according to an exemplary embodiment.

FIG. 8 is a flowchart illustrating a method of manufacturing an LCD device, according to an exemplary embodiment. FIG. 9 is a layout view of a pixel region for explaining the method of FIG. 8 according to an exemplary embodiment. FIG. 10 is a cross-sectional view taken along sectional line X-X' of FIG. 9 according to an exemplary embodiment.

Referring to FIG. 8, FIG. 9, and FIG. 10, a first substrate 100 is prepared (S110) by forming a gate wiring layer (not illustrated), a first insulating layer 121, a semiconductor layer, a data wiring layer 141, a passivation layer 122, a planarization layer 160, a common electrode 170, a second insulating layer 123, and a pixel electrode 180 on a first base substrate 101 (S110). Each of the gate wiring layer, the semiconductor layer, and the data wiring layer 141 may be formed by forming and patterning a thin film. The patterning of the thin film may be performed using a mask process or another process for forming patterns. The first insulating layer 121, the second insulating layer 123 and the passivation layer 122 may be formed by deposition. Thereafter, a second substrate 200 is prepared by forming a light-shielding member (not illustrated), a color filter 220, and an overcoat layer 230 on a second base substrate 201 (S120). The first substrate 100 may be a lower display substrate, and the second substrate 200 may be an upper display substrate. The arrangement and the shapes of elements included in each of the first substrate 100 and the second substrate 200 have already been described above with reference to FIG. 2, FIG. 3, and FIG. 4, and thus, detailed descriptions thereof will be omitted.

Thereafter, the second substrate 200 is arranged to face the first substrate 100 and is bonded onto the first substrate 100, and a liquid crystal layer 301 including liquid crystals 310 and photo-reactive single molecules 400 is interposed between the first substrate 100 and the second substrate 200 (S130). Step S130 may include dropping a liquid crystal composition including the photo-reactive single molecules 400 and the liquid crystals 310 onto the first substrate 100 and/or the second substrate 200 and then bonding the first and second substrates 100 and 200 together, or may include bonding the first and second substrates 100 and 200 first and then injecting the liquid crystal composition between the first and second substrates 100 and 200. The liquid crystal composition may further include a polymerization initiator.

In step S130, the liquid crystals 310 in the liquid crystal layer 301 are substantially horizontally aligned but may have a substantially random alignment state with no particular directionality.

The photo-reactive single molecules 400 may be reactive mesogens. The photo-reactive single molecules 400 have already been described above with reference to FIG. 2, FIG. 3, and FIG. 4, and thus, a detailed description thereof will be omitted.

Figure 11:
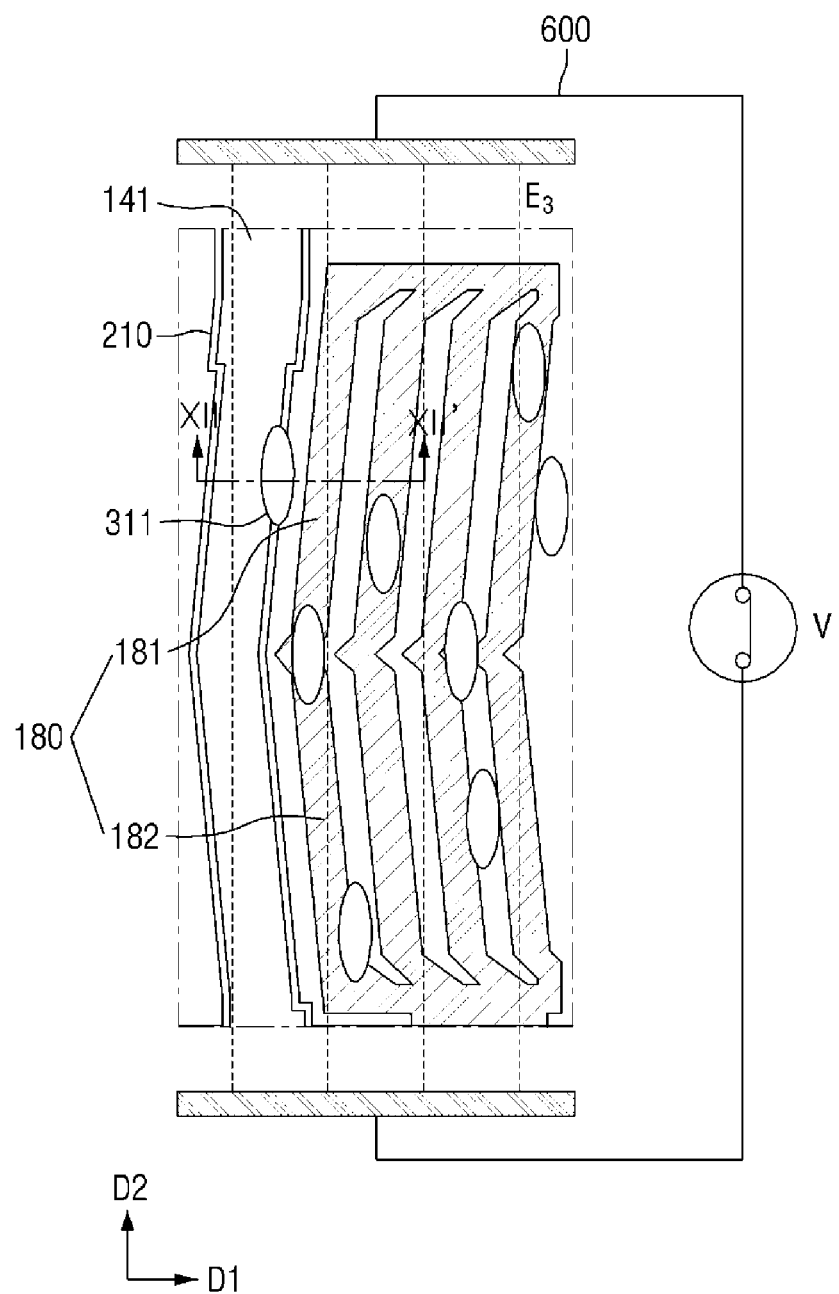
FIG. 11 is a layout view of a pixel region for explaining the method of FIG. 8 according to an exemplary embodiment.
Figure 12:
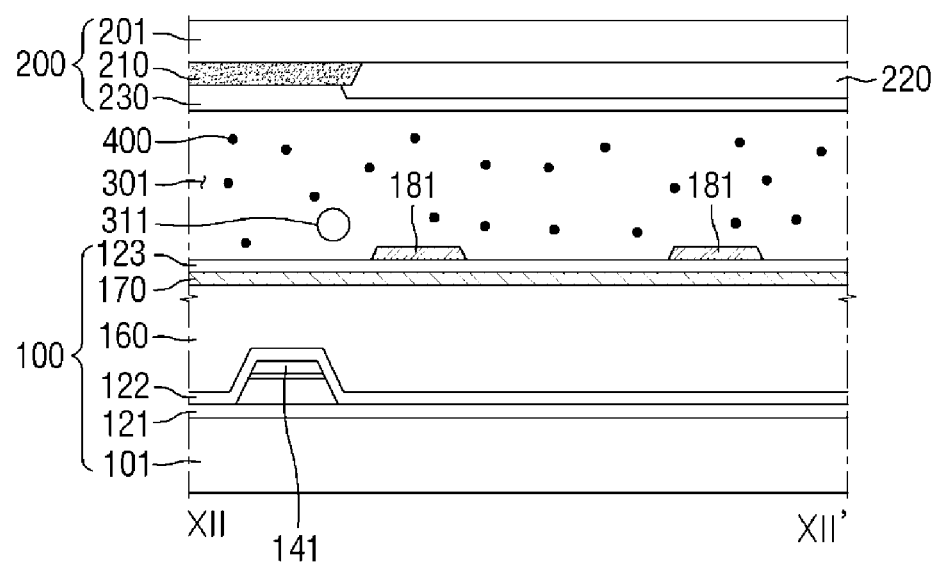
FIG. 12 is a cross-sectional view taken along sectional line XII-XII' of FIG. 11 according to an exemplary embodiment.

FIG. 11 is a layout view of a pixel region for explaining the method of FIG. 8 according to an exemplary embodiment. FIG. 12 is a cross-sectional view taken along sectional line XII-XII' of FIG. 11 according to an exemplary embodiment.

Referring to FIGS. 8 through 12, an electric field $E_3$ is applied to the liquid crystal layer 301 (S140). The electric field $E_3$ is applied by external electric field forming means 600 from outside the liquid crystal layer 301, which is interposed between the first and second substrates 100 and 200 and includes liquid crystals 310 having positive dielectric anisotropy, and the direction of the electric field $E_3$ may intersect the second direction D2, i.e., the direction of an electric field formed between the common electrode 170 and the pixel electrode 180. The external electric field forming means 600 may include two electrodes, which face each other and are provided with different voltages. In a case in which the electric field $E_3$ is formed along the second direction D2, the liquid crystals 310 having positive dielectric anisotropy may rotate in a plane and may be realigned and maintained in such a state that long axes of liquid crystals 311 may be oriented substantially toward the second direction D2, and particularly, a direction parallel to the electric field $E_3$ applied by the external electric field forming means 600.

On the other hand, when liquid crystals having negative dielectric anisotropy are used, if the external electric field is formed along the second direction D2, the liquid crystals having negative dielectric anisotropy may rotate in plane and may be realigned and maintained in such a state that their long axes may be oriented substantially toward a first direction D1, and particularly, a direction perpendicular to the external electric field applied by the external electric field forming means 600.

If the manufacture of an LCD device involves transferring a mother board obtained by bonding the first substrate 100 (i.e., a lower display substrate) and the second substrate 200 (i.e., an upper display substrate) together with the use of transfer means, the external electric field forming means 600 may form the electric field $E_3$ along and throughout the entire path of travel of the transfer means or may be disposed on the path of movement of the mother board so as to form the electric field $E_3$ in at least part of the mother board. The external electric field forming means 600 may be disposed ahead of ultraviolet (UV) irradiation means that will be described later. If the manufacture of an LCD device does not involve transferring the mother board, the external electric field forming means 600 may form the electric field $E_3$ in and throughout the entire mother board or may form the electric field $E_3$ in at least part of the mother board while moving along with the UV irradiation means.

Figure 13:
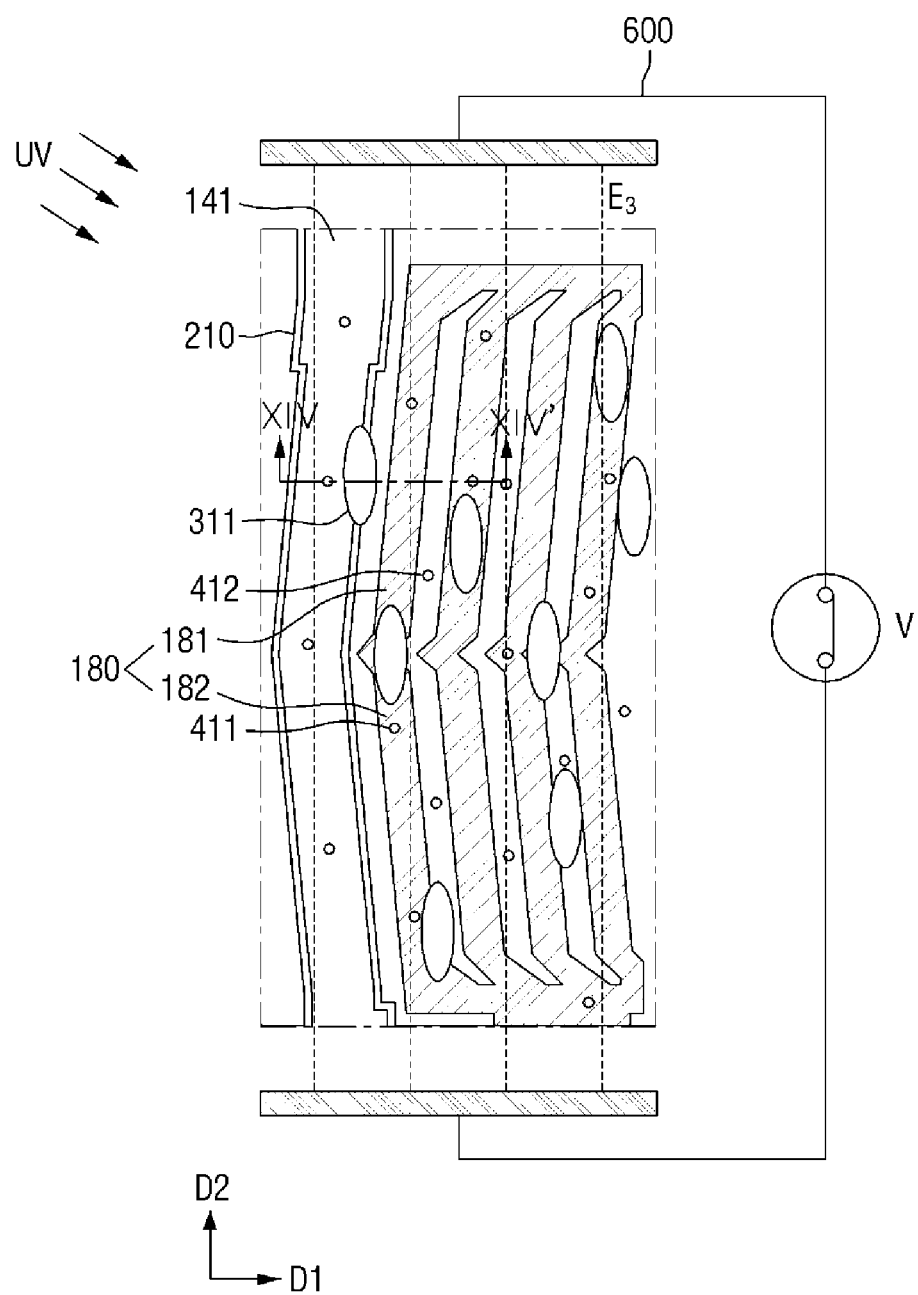
FIG. 13 is a layout view of a pixel region for explaining the method of FIG. 8 according to an exemplary embodiment.
Figure 14:
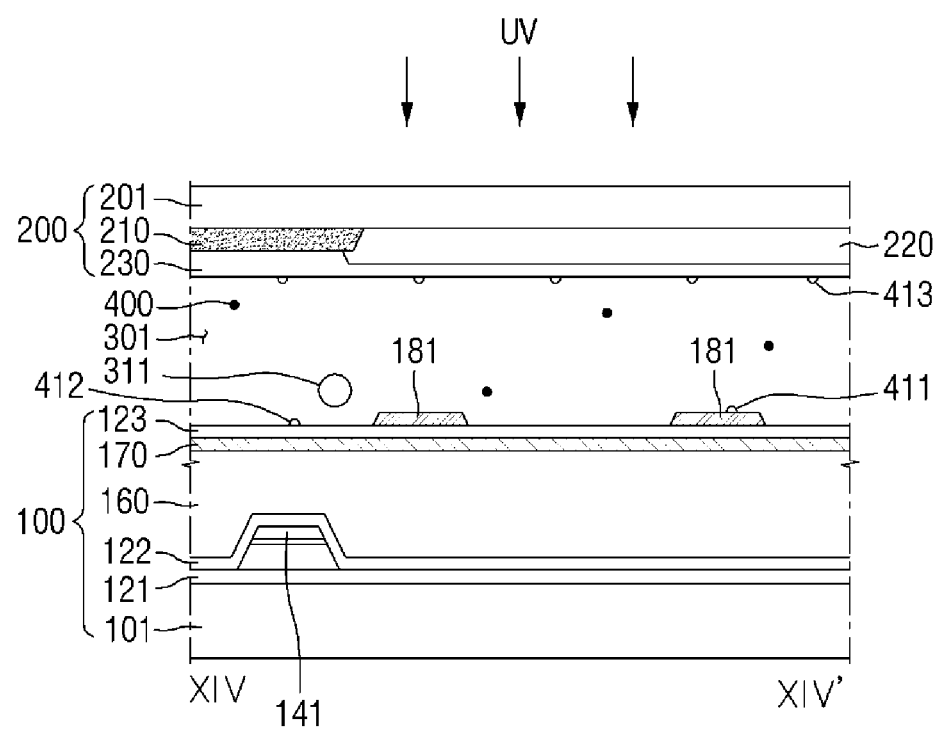
FIG. 14 is a cross-sectional view taken along sectional line XIV-XIV' of FIG. 13 according to an exemplary embodiment.

FIG. 13 is a layout view of a pixel region for explaining the method of FIG. 8 according to an exemplary embodiment. FIG. 14 is a cross-sectional view taken along sectional line XIV-XIV' of FIG. 13 according to an exemplary embodiment.

Referring to FIGS. 8 through 14, light is applied in the presence of an electric field applied to the liquid crystal layer 301 (S140). The light applied in step S140 may be UV light. For example, the light applied in step S140 may be UV light having a wavelength of about 300 nanometer (nm) to about 380 nm, about 350 nm to about 380 nm, or about 355 nm to about 370 nm. In step S140, light may be applied to an exposure amount of about 0.1 $J/m^2$ to about 15 $J/cm^2$ or about 1 $J/m^2$ to about 4 $J/m^2$. The light applied in step S140 may be non-polarized light. The amount and duration of exposure of the liquid crystal layer 301 to the light applied in step S140 may affect the degree of polymerization of photo-reactive single-molecules 400, i.e., the degree of formation of first projections 411, second projections 412, and third projections 413. FIG. 14 illustrates an example in which light is applied to the liquid crystal layer 301 from above the second substrate 200, but light may be applied from below the first substrate 100 or from both above the second substrate 200 and below the first substrate 100.

In response to light being applied to the liquid crystal layer 301 including the photo-reactive single molecules 400, the photo-reactive single molecules 400 may be polymerized by a photo-polymerization reaction. To lower surface energy, the polymers of the photo-reactive single molecules 400 may be directly adhered onto the surface of the pixel electrode 180 of the first substrate 100 so as to form the first projections 411, may be directly adhered onto the surface of the second insulating layer 123 of the first substrate 100 so as to form the second projections 412, and may be directly adhered onto the surface of the overcoat layer 230 of the second substrate 200 so as to form the third projections 413. Substantially none of the polymers of the photo-reactive single molecules 400 may exist in the liquid crystal layer 301.

Particularly, in a case in which the photo-reactive single molecules 400 form the first projections 411, the second projections 412, and the third projections 413 in a state in which the liquid crystals 311 are initially aligned by the electric field $E_3$ such that their long axes may be oriented toward the second direction D2, the first projections 411, the second projections 412, and the third projections 413 may be formed to have a suitable size, shape, density, and polymerization degree for maintaining the alignment state of the liquid crystals 311 even after the electric field $E_3$ is released. The alignment state of the first projections 411, the second projections 412, and the third projections 413 may exhibit particular directionality over the surfaces of the first and second substrates 100 and 200. Accordingly, anisotropy may be imparted to the surfaces of the first and second substrates 100 and 200 without the use of a PI-based alignment layer, and thus, the liquid crystals 311 may be initially aligned in a proper manner.

In step S140, content of the photo-reactive single molecules 400 in the liquid crystal layer 301 may be reduced, and the reduced amount of photo-reactive single molecules 400 may be understood to have been used in the formation of the polymers of the photo-reactive single molecules 400. At least some photo-reactive single molecules 400 may remain unreacted in the liquid crystal layer 301.

Figure 15:
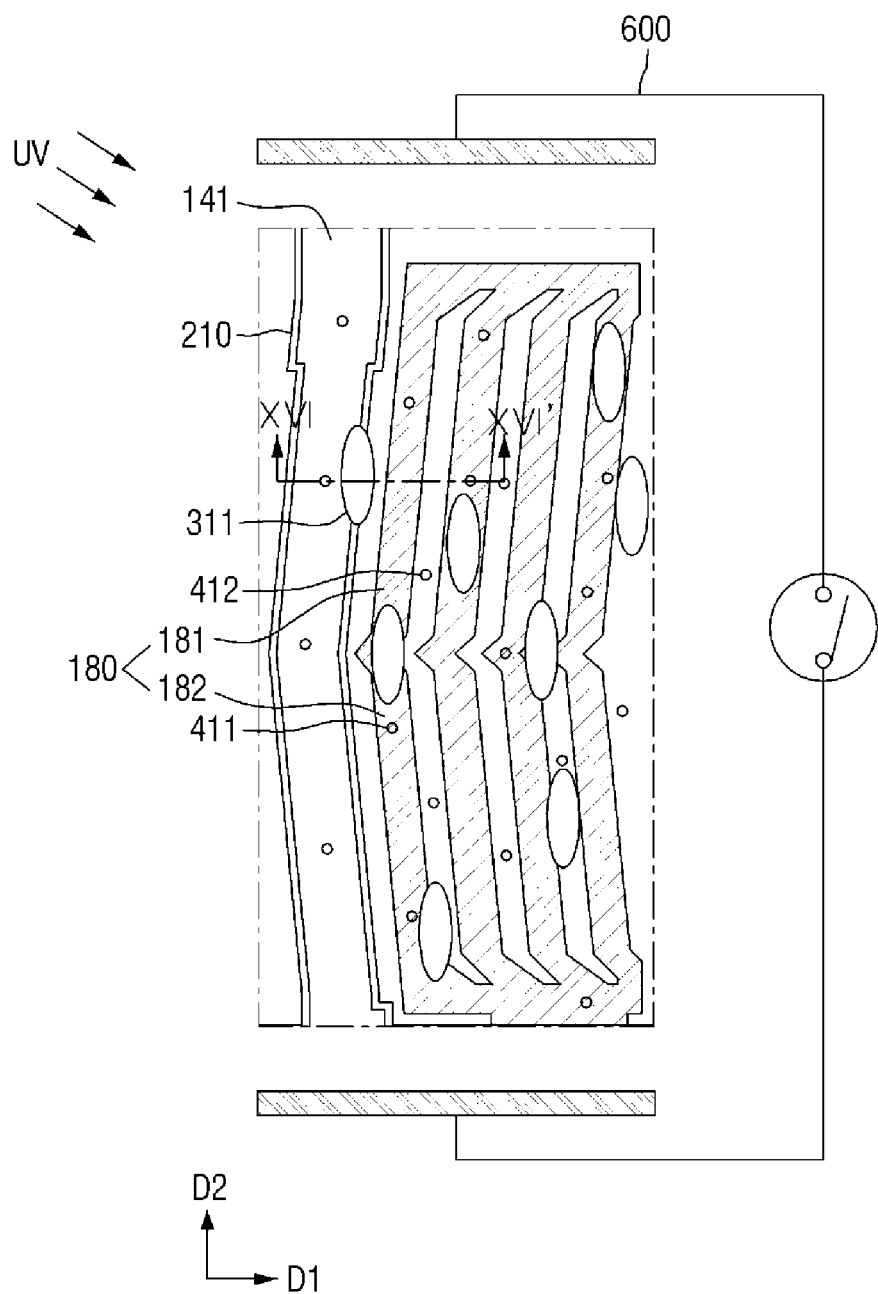
FIG. 15 is a layout view of a pixel region for explaining the method of FIG. 8 according to an exemplary embodiment.
Figure 16:
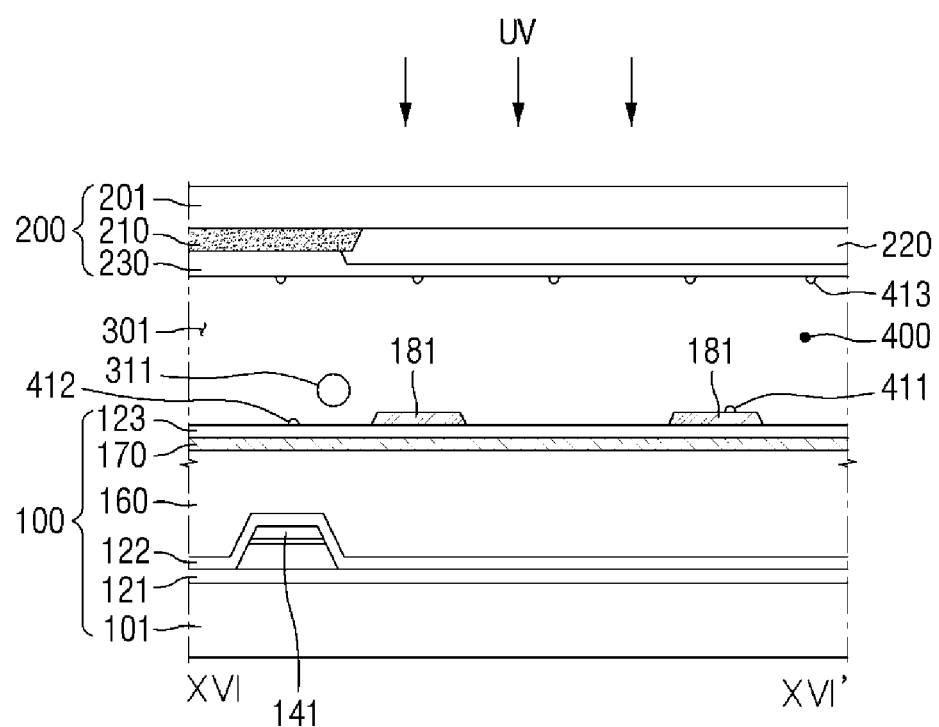
FIG. 16 is a cross-sectional view taken along sectional line XVI-XVI' of FIG. 15 according to an exemplary embodiment.

FIG. 15 is a layout view of a pixel region for explaining the method of FIG. 8 according to an exemplary embodiment. FIG. 16 is a cross-sectional view taken along sectional line XVI-XVI' of FIG. 13 according to an exemplary embodiment.

Referring to FIGS. 8 through 16, light is applied in a state in which the electric field formed in the liquid crystal layer 301 is released (S150). After the formation of the first projections 411, the second projections 412, and the third projections 413, the alignment direction of the liquid crystals 311 may be stabilized and may be maintained even in the absence of an electric field.

The light applied in step S150 may be non-polarized UV light having substantially the same wavelength as, and/or applied to the same exposure amount as, the light applied in step S140. Step S150 may be performed for a longer period of time than step S140. For example, step S150 may be performed for about 120 minutes or less or for about 80 minutes or less, but the present invention is not limited thereto.

By applying light to the liquid crystal layer 301 in the absence of an electric field, the remaining photo-reactive single molecules 400 in the liquid crystal layer 301 may be removed. Accordingly, content of the photo-reactive single molecules 400 in the liquid crystal layer 301 may be reduced to 100 ppm or less, and thus, defects such as image sticking that may be caused during the driving of an LCD device may be alleviated.

Figure 17:
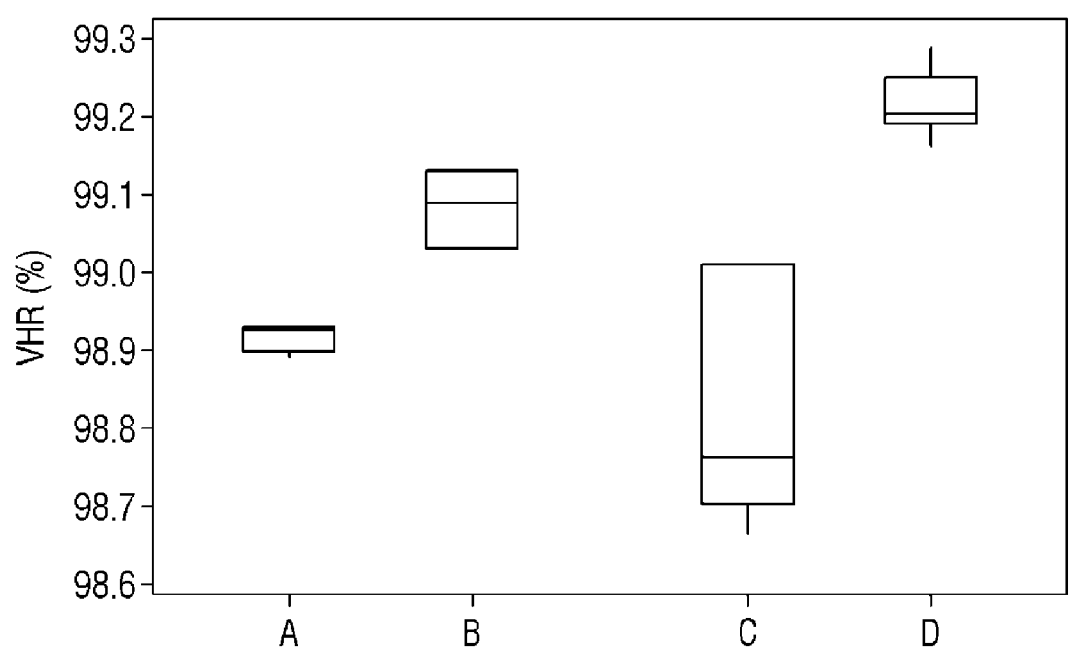
FIG. 17 is a graph showing voltage holding ratio (VHR) measurements obtained from an LCD device according to an exemplary embodiment and an LCD device according to a comparison example.

FIG. 17 is a graph showing voltage holding ratio (VHR) measurements obtained from an LCD device according to an exemplary embodiment and an LCD device according to a comparison example.

Referring to FIG. 17, reference character A shows VHR measurements obtained from an LCD device according to an exemplary embodiments, which was manufactured using the compound represented by Formula 2 as photo-reactive single molecules, before applying light to the liquid crystal layer in the presence of an electric field, reference character B shows VHR measurements obtained from the LCD device according to an exemplary embodiment after applying light to the liquid crystal layer in the presence of an electric field, reference character C shows VHR measurements obtained from an LCD device according to a comparative example, which was manufactured using a compound represented by Formula 2 as photo-reactive single molecules and includes a PI-based alignment layer, before applying light to the liquid crystal layer in the presence of an electric field, and reference numeral D shows VHR measurements obtained from the LCD device according to a comparative example after applying light to the liquid crystal layer in the presence of an electric field. Formula 2 is as follows:

<Formula 2>

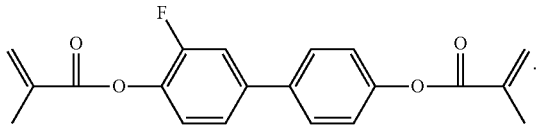

VHR is the time rate of maintaining voltages applied to a liquid crystal layer for a single period. A flicker phenomenon may become visible at a low VHR. As shown in FIG. 17, a slight increase in VHR is detected in both cases of not using a PI alignment layer (cases A and B) or using a PI-based alignment layer (cases C and D). The VHR in case B (i.e., a case in which liquid crystals were initially aligned by applying non-polarized UV light in the presence of an external electric field so as to form the polymers of photo-reactive single molecules) is about 99.1%, which is relatively lower than the VHR in case D (i.e., a case in which a PI-based alignment layer was used), but is still high enough to prevent the occurrence of a flicker phenomenon in an LCD device.

According to an exemplary embodiment, a sufficiently high voltage holding ratio (VHR) may be obtained, and at the same time, an alignment of liquid crystals in a liquid crystal layer may be stabilized without a PI-based alignment layer. Also, various defects, such as image sticking that may be generated while driving an LCD device, may be suppressed, and an improved display quality may be obtained by increasing the response speed of an LCD device.

In addition, cost of maintaining and managing a PI-based alignment layer composition for manufacturing an LCD device may be reduced, and an LCD device manufacturing process may be simplified by skipping various thermal treatment processes, such as drying, curing, and baking the PI-based alignment layer.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display device, comprising:
   a first substrate comprising a first base substrate, a first field-generating electrode disposed on the first base substrate, and a second field-generating electrode disposed on the first field-generating electrode;
   a second substrate facing the first base substrate and disposed spaced apart from the first substrate;
   a liquid crystal layer comprising liquid crystals, the liquid crystal layer, in which an electric field is formed by the first field-generating electrode and the second field-generating electrode, being disposed between the first substrate and the second substrate and contacting the second field-generating electrode; and
   a plurality of first projections disposed between the second field-generating electrode and the liquid crystal layer.

2. The liquid crystal display device of claim 1, further comprising an insulating layer disposed between the first field-generating electrode and the second field-generating electrode, and a plurality of second projections disposed between the insulating layer and the liquid crystal layer, wherein:
   the first field-generating electrode comprises a common electrode;
   the second field-generating electrode comprises a pixel electrode and partially exposes the insulating layer; and
   the insulating layer contacts the liquid crystal layer through the exposed portion.

3. The liquid crystal display device of claim 2, wherein a degree of unevenness of a surface of the second field-generating electrode defined by the first projections is different from a degree of unevenness of a surface of the insulating layer defined by the second projections.

4. The liquid crystal display device of claim 2, wherein:
   the plurality of first projections and the plurality of second projections are spaced apart from one another, each of the first and second projections having a shape in the form of a dot in a plan view; and a maximum distribution density of the plurality of first projections and the plurality of second projections in a first direction is different from a maximum distribution density of the plurality of first projections and the plurality of second projections in a second direction crossing the first direction.

5. The liquid crystal display device of claim 2, wherein the second substrate comprises:
a second base substrate facing the first substrate; and
an overcoat layer disposed on the second base substrate and contacting the liquid crystal layer,
wherein the liquid crystal display device further comprises a plurality of third projections disposed between the overcoat layer and the liquid crystal layer.

6. The liquid crystal display device of claim 1, wherein:
the second field-generating electrode comprises a plurality of branch electrodes extending along a direction in parallel with one another;
the liquid crystals have positive dielectric anisotropy; and
an angle between a direction of long axes of the liquid crystals and the direction of the plurality of branch electrodes is equal to or greater than 0 degrees and equal to or less than 45 degrees in an initial alignment state.

7. The liquid crystal display device of claim 1, wherein:
the second field-generating electrode comprises a plurality of branch electrodes extending along a direction in parallel with one another;
the liquid crystals have negative dielectric anisotropy; and
an angle between a direction of long axes of the liquid crystals and the direction of the plurality of branch electrodes is equal to or greater than 45 degrees and equal to or less than 90 degrees.

8. The liquid crystal display device of claim 1, wherein the plurality of first projections comprises polymers of a first photo-reactive single molecule.

9. The liquid crystal display device of claim 8, wherein:
the liquid crystal layer further comprises a second photo-reactive single molecule; and
the second photo-reactive single molecule and the first photo-reactive single molecule are substantially the same.

10. The liquid crystal display device of claim 9, wherein a content of the second photo-reactive single molecule in the liquid crystal layer is equal to or less than 100 parts per million (ppm).

11. A method of manufacturing a liquid crystal display device, comprising:
preparing a first substrate comprising a first base substrate, a first field-generating electrode disposed on the first base substrate, an insulating layer disposed on the first field-generating electrode, and a second field-generating electrode disposed on the insulating layer;
preparing a second substrate facing the first base substrate and spaced apart from the first substrate;
providing a liquid crystal layer comprising a photo-reactive single molecule and liquid crystals, the liquid crystal layer being disposed between the first substrate and the second substrate and contacting the second field-generating electrode;
applying light in a state in which an electric field is applied to the liquid crystal layer; and
forming photopolymer projections between the second field-generating electrode and the liquid crystal layer.

12. The method of claim 11, wherein applying the light is performed after providing the liquid crystal layer.

13. The method of claim 12, wherein applying the light comprises applying non-polarized ultraviolet (UV) light in a state in which an electric field is applied to the liquid crystal layer.

14. The method of claim 12, wherein forming the photopolymer projections comprises:
forming polymers by polymerizing the photo-reactive single molecule in the liquid crystal layer; and
making the polymers adhere to a surface of the second field-generating electrode to form the photopolymer projections.

15. The method of claim 11, wherein a direction of the electric field applied to the liquid crystal layer intersects a direction of an electric field generated between the first field-generating electrode and the second field-generating electrode.

16. The method of claim 15, wherein the electric field is applied to the liquid crystal layer from the outside the first substrate and the second substrate bonded together.

17. The method of claim 15, wherein applying the light comprises:
applying the electric field to a portion of the liquid crystal layer; and
applying light to the portion of the liquid crystal layer in a state in which the electric field applied to the portion of the liquid crystal layer.

18. The method of claim 11, further comprising applying light in a state in which no electric field is applied to the liquid crystal layer after applying the light.

19. The method of claim 18, wherein applying the light in the state in which no electric field is applied to the liquid crystal layer comprises applying light such that a content of the photo-reactive single molecule in the liquid crystal layer to be equal to or less than 100 ppm.

20. The method of claim 18, wherein the liquid crystals applied light in the state in which no electric field is applied to the liquid crystal layer and the liquid crystals applied light in the state in which the electric field is applied to the liquid crystal layer have substantially the same alignment direction.

* * * * *